United States Patent
Tse et al.

(10) Patent No.: US 9,042,817 B2
(45) Date of Patent: May 26, 2015

(54) METHOD AND SYSTEM TO AUTOMATICALLY ESTABLISH NFC LINK BETWEEN NFC ENABLED ELECTRONIC DEVICES BASED ON PROXIMATE DISTANCE

(71) Applicants: Kin-Man Tse, Hong Kong (HK); Wai-Pun Chung, Hong Kong (HK)

(72) Inventors: Kin-Man Tse, Hong Kong (HK); Wai-Pun Chung, Hong Kong (HK)

(*) Notice: Subject to any disclaimer, the term of this patent is extended or adjusted under 35 U.S.C. 154(b) by 104 days.

(21) Appl. No.: 13/788,290

(22) Filed: Mar. 7, 2013

(65) Prior Publication Data
US 2014/0256249 A1 Sep. 11, 2014

(51) Int. Cl.
*H04B 5/00* (2006.01)
*H04B 5/02* (2006.01)

(52) U.S. Cl.
CPC ............ *H04B 5/0031* (2013.01); *H04B 5/0062* (2013.01); *H04B 5/02* (2013.01); *H04B 5/0075* (2013.01)

(58) Field of Classification Search
CPC ...... H04B 5/0031; H04B 5/0056; H04B 5/02; H04B 5/0037; H04B 5/00; H04B 7/26
USPC ........ 455/41.1, 41.2, 404.2, 456.1, 448, 13.3; 340/686.6, 10.6
See application file for complete search history.

(56) References Cited

U.S. PATENT DOCUMENTS

| | | | | |
|---|---|---|---|---|
| 2009/0312000 A1* | 12/2009 | Wakefield et al. | ............ | 455/418 |
| 2010/0045441 A1* | 2/2010 | Hirsch et al. | ................. | 340/10.1 |
| 2012/0088487 A1* | 4/2012 | Khan | ............................. | 455/418 |
| 2012/0322500 A1* | 12/2012 | Charrat et al. | ............. | 455/552.1 |
| 2012/0329389 A1* | 12/2012 | Royston et al. | ............. | 455/41.1 |
| 2013/0097031 A1* | 4/2013 | Royyuru et al. | ................ | 705/16 |
| 2013/0316645 A1* | 11/2013 | Li et al. | ........................ | 455/41.1 |
| 2014/0052532 A1* | 2/2014 | Tsai et al. | .................. | 705/14.51 |
| 2014/0052637 A1* | 2/2014 | Jooste et al. | ..................... | 705/44 |
| 2014/0113548 A1* | 4/2014 | Camulli | ........................ | 455/41.1 |
| 2014/0113552 A1* | 4/2014 | Siddiqui | ....................... | 455/41.1 |
| 2014/0139347 A1* | 5/2014 | Forster | ........................ | 340/686.6 |
| 2014/0220885 A1* | 8/2014 | Chou et al. | ................... | 455/41.1 |
| 2014/0268203 A1* | 9/2014 | Saotome | ....................... | 358/1.13 |
| 2014/0268209 A1* | 9/2014 | Yokoyama | .................... | 358/1.14 |

* cited by examiner

*Primary Examiner* — Minh D Dao
(74) *Attorney, Agent, or Firm* — Sonya C. Harris; Invention Services

(57) ABSTRACT

Presented is a near field communication system and method to automatically establish an interconnection between two electronic devices. The system includes a first electronic device including an NFC chip communicatively coupled to a passive NFC tag, where the NFC tag having an integrated circuit with a predefined information content, a second device including an active NFC reader configured to read the predefined information content from the NFC tag based on an identification of a proximate distance therebetween, and where the NFC tag is capable of transmitting an activation signal to the NFC chip to enable transition of the NFC chip from a first state to a second state such as to establish a near field wireless communication link between the two devices to enable exchange of digital content therebetween.

12 Claims, 4 Drawing Sheets

US 9,042,817 B2

METHOD AND SYSTEM TO AUTOMATICALLY ESTABLISH NFC LINK BETWEEN NFC ENABLED ELECTRONIC DEVICES BASED ON PROXIMATE DISTANCE

FIELD OF INVENTION

The present invention in general relates to a communication system and in particular, to a near field communication system and an associated method thereof capable of automatically establishing a wireless near field communication link between two NFC enabled electronic devices based a proximate distance and to enable exchange of digital content therebetween.

BACKGROUND OF THE INVENTION

Researchers are continually working to provide value added functionalities in devices for consumers. Beyond the functions already included in the devices, the researchers are working on great arrays of technologies to enhance the usability of the products for the consumers. To be competitive and provide more sophisticated electronic devices including the mobile communication devices, the researchers need to address the ever growing requirement of the consumers using modern technologies.

Typically the market today is headed towards adoption of NFC technology in a whole range of applications. NFC is based on RFID and is not very new to us. It is a fact that only recently the technology has reached a point where a whole host of real world applications including mobile communication devices incorporate this technology. These electronic devices incorporate NFC chips which help in establishing a contactless short-range wireless communications based on radio frequency identification (RFID) standards, magnetic field induction i.e. Bluetooth to enable communication between the two electronic devices including mobile communication devices.

What is required is a near field communication system and method that can provide access to additional functionality of the hands-free technology offered by the near field communication technologies, such as Bluetooth. There also exists a need for a system and method that can enable exchange of digital contents between mobile communication devices besides establishing an automatic near field wireless communication link therebetween based on their proximity.

There further exists the need for a system and method that would overcome or at least ameliorate the short comings associated with conventionally employed systems, methods or techniques for automatic exchange of data.

BRIEF SUMMARY OF THE INVENTION

It is an objective of the present invention to provide a near field communication system that employs a near field communication link to establish interaction between two NFC enabled electronic devices and that would be best choice for consumer experience, power, and/or cost savings.

Another notable feature of the present invention is it enable mobile peer-to-peer data exchange with greater ease based on the proximate distance between two NFC enabled electronic devices.

According to a first aspect of the present invention, a near field communication system configured to automatically establish an interconnection between two electronic devices includes a first electronic device including an NFC chip communicatively coupled to a passive NFC tag, the passive NFC tag having an integrated circuit with a predefined information content, a second device including an active NFC reader configured to read the predefined information content of the NFC tag based on an identification of a proximate distance therebetween, and where the passive NFC tag being capable of transmitting an activation signal to the NFC chip to enable transition of the NFC chip from a first state to a second state such as to establish a near field wireless communication link between the devices and enable exchange of digital content therebetween.

According to a second aspect of the present invention, a near field communication method to automatically establish an interconnection between two electronic devices includes reading, a predefined information content of a passive NFC tag communicatively coupled to an NFC chip, both being operably configured in a first electronic device, by an active NFC reader configured in a second electronic device, transmitting, via communication between the passive NFC tag and the NFC chip, an activation signal to the NFC chip, and receiving, from the passive NFC tag, the activation signal, by the NFC chip to enable transition from a first state to a second state associated thereof such as to establish a near field wireless communication link between the devices and enable exchange of digital content therebetween.

These and other objectives, aspects, and advantages of the present subject matter will be better understood with reference to the following description and appended claims. This summary is just provided to introduce the concepts in a simplified form. The summary is not intended to identify key features or essential features of claimed subject matter, nor is it intended to be used to limit the scope of the claimed subject matter.

BRIEF DESCRIPTION OF DRAWINGS

A full understanding of the invention can be gained from the following description of the preferred embodiments when read in conjunction with the accompanying drawings in which.

DETAILED DESCRIPTION OF THE PREFERRED EMBODIMENTS

Figure 1A:
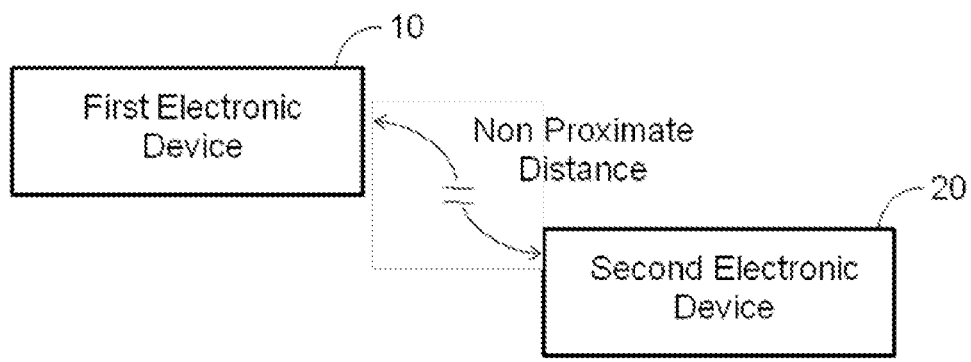
FIG. 1A-FIG. 1B is schematic diagrams illustrating a near field communication environment, in accordance with an exemplary embodiment of the present invention.
Figure 1B:
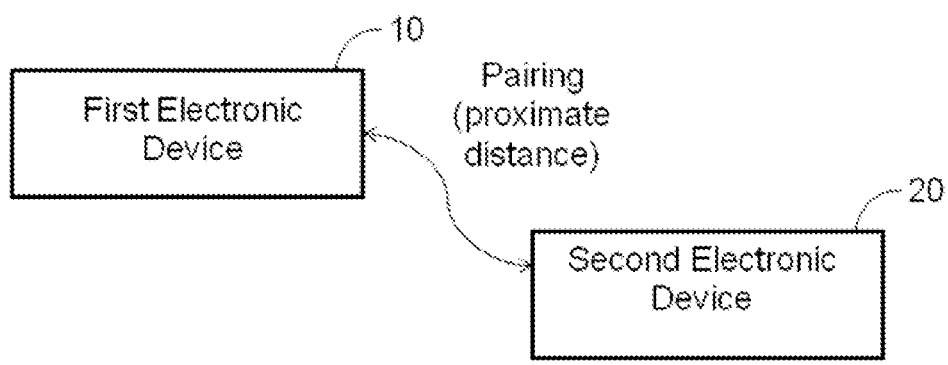

It is to be understood that the phraseology and terminology used herein is for the purpose of description and should not be regarded as limiting. The use of term "active NFC reader" refers to a NFC reader/writer which reads/writes on an NFC tag, and is equipped with its own power source. As used herein, the terms "chip" "integrated circuit" or similar terms, are used interchangeably, as used in the electronics. The present invention is applicable to all the above as these terms are generally understood in the field.

The invention is going to be described in greater detail below with specific embodiments, NFC-enabled devices and applications have utility in various consumer electronics and industrial products. The invention is going to be described in a peer-to-peer scenario, where NFC is used to enable communication between two devices so that data can be transmitted locally between the two. It should be understood that the invention is not limited to its application described. It can also be used for service initiation applications where it can be used to unlock a communication link to enable data transfer or for payment and ticketing applications or others.

Near field communication method and system in accordance with the present invention helps is an automatic establishment of a near filed wireless communication link between two NFC-enabled devices, where one NFC enabled device determine the signal strength received from an NFC reader present in another NFC device, and to take one or more actions based on that measured signal strength.

Reference will now be made in detail to one or more embodiments of the invention, example of one of which is illustrated in the drawings. The example and embodiment is provided by way of explanation of the invention, and is not meant as a limitation of the invention. For example, features illustrated or described as part of one embodiment may be used with another embodiment to yield still a further embodiment.

Referring now to FIGS. 1-4, and FIG. 1A-FIG. 1B in particular which shows a preferred example embodiment of a near field communication environment of present subject matter. FIG. 1A shows a first electronic device 10 not being able to pair up with a second electronic device 20 through a near field communication link as the second electronic device 20 is beyond a predefined proximate distance from the first electronic device 10. However, when the second electronic device 20 arrives at or within the proximate distance range (of few centimeters), the near field wireless communication link between the electronic devices 10, 20 get established and a handshake between the two devices 10, 20 take place, as shown illustrated in FIG. 1B, enabling the devices 10, 20 to exchange data between them preferably digital contents. The full details of operation onto how the connection is established will be described with reference to FIG. 2 below. The first and second electronic devices 10, 20 preferably include NFC enabled devices mobile phones, wireless consumer electronics like speakers, media players and the like.

Figure 2:
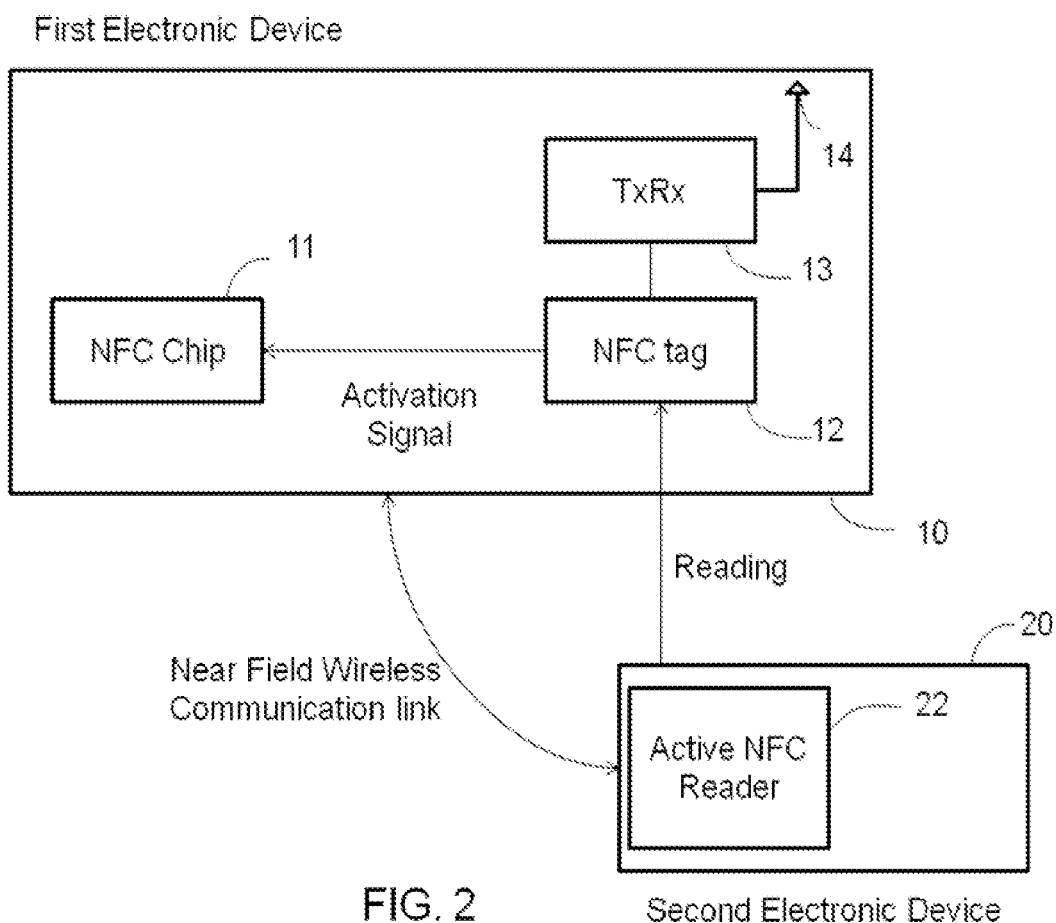
FIG. 2 is a block diagram illustrating one or more hardware components configured as an integral part of a near field communication system, according to an exemplary embodiment.
Figure 3:
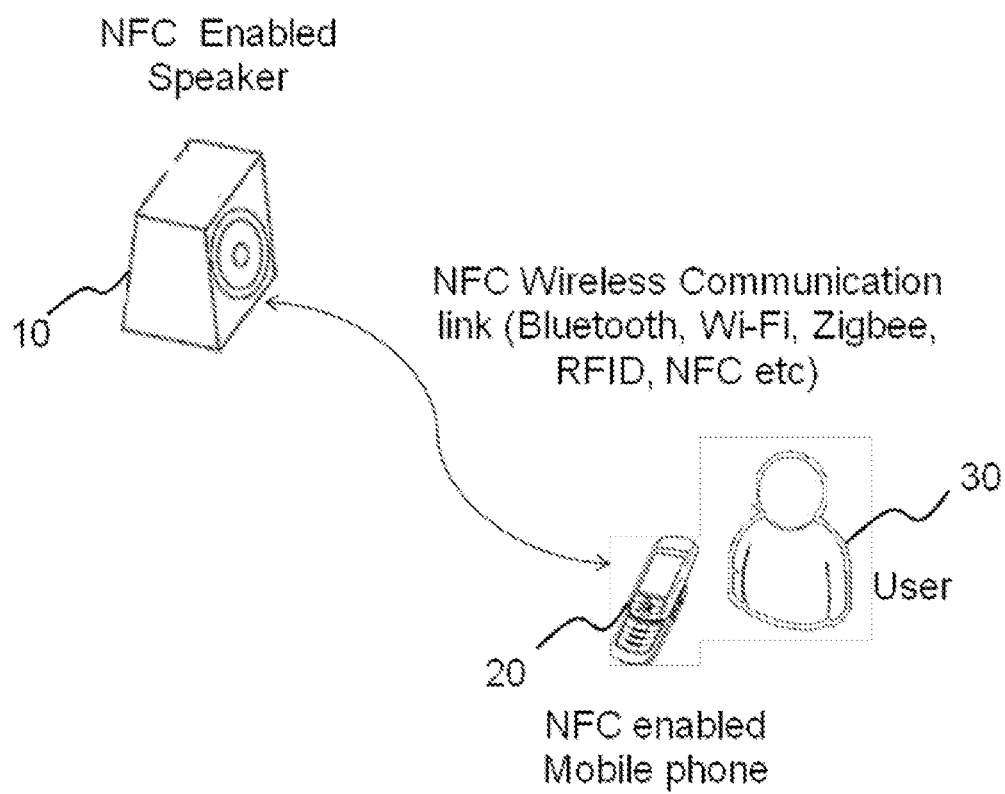
FIG. 3 is a schematic diagram illustrating an example embodiment of this invention.

The near field communication system, as will be explained more fully below with reference to FIG. 2, preferably includes a near field communication (NFC) chip 11 or other inductive-coupling based, short-range connectivity capabilities, a passive NFC tag 12, a transceiver 13 with an antenna 14 embodied in the first electronic device 10 for transmitting and receiving signal to and from the NFC chip 11 and an active NFC reader 22 respectively. As shown in FIG. 2-FIG. 3, the second electronic device 20, such as a mobile phone 20, ipad, and the like carried by a user 30 is able to communicate with another NFC enabled or similar type devices, such as speaker 10 over an NFC wireless communication link preferably a Bluetooth, Wi-Fi, Wireless Local Area Network (WLAN), Infrared Data Association (IrDA), Zigbee, Radio Frequency Identification (RFID), and Near Field Communication (NFC), and the like when the mobile phone 20 arrives within a predefined proximate range with the speaker 10.

As seen, the NFC enabled mobile phone 20 carried by the user 30 when arrives at the proximate distance (of few centimeters) with the NFC enabled speaker 10, the proximity enables the active NFC reader 22 of the mobile phone 20 to read the predefined information content stored in an integrated circuit associated with the passive NFC tag 12. The predefined information content of the NFC tag 12 preferably include a uniform resource locator (URL), a short message service (SMS), a Phone number, an authenticated code, or the like. On detecting proximity of the mobile phone 20, the NFC tag 12 generates and transmits an activation signal to the NFC chip 11 in communication therewith. The NFC tag 12 transmits and receives the signals to and from the NFC chip 11 and the mobile phone 20 respectively by means of the transceiver 13. The transceiver (TxRx) 13 includes the antenna 14 and a backend associated electronic circuitry as will apparent those skilled in the art. The NFC chip 11 on receiving the activation signal from the NFC tag 12 wakes up or gets ON and transits to an ON state i.e. an active state from a first state i.e. a preexisting standby state to enable pairing with the mobile phone 20. The communication pairing of the mobile phone 20 and the speaker is by means of the near field wireless communication link preferably but not limited to a Bluetooth, Wi-Fi, Wireless Local Area Network (WLAN), Infrared Data Association (IrDA), Zigbee, Radio Frequency Identification (RFID), and Near Field Communication (NFC), and the like. On pairing, the speaker 10 is able to play digital content (audio songs for example) from the mobile phone 20 as long as the mobile phone 20 carried by the user 30 remains in the proximate range with the speaker 10.

According to one another embodiment, the active NFC reader 22 or optionally an NFC reader/writer 22 used and described herein in the embodiment above may be passive in nature which would generally be activated by the user 30 on arriving at the proximate distance with the speaker 10. In such embodiments, the speaker 10 so to say the detection circuitry determine the proximate distance of the mobile phone 20 with the speaker 10 based on the signal strength received from an NFC reader's field, and then the NFC tag 12 wakes up the NFC chip 11 to take one or more actions based on that measured signal strength. The action as explained above is establishment of the near field wireless communication link with the mobile phone 20 and exchange or sharing of digital contents with the mobile phone 20. The digital content preferably includes an audio content, a video content, a textual content, and the like. By the way of an example, the mobile phone 20 will be able to automatically play audio through the speaker 10 on arriving in the proximate distance with speaker 10. Description of some components, for example the presence of processor and other backend wireless communication circuitry in the devices 10, 20 is omitted herein in the embodiments above considering it to be well known by a person skilled in the art.

Figure 4:
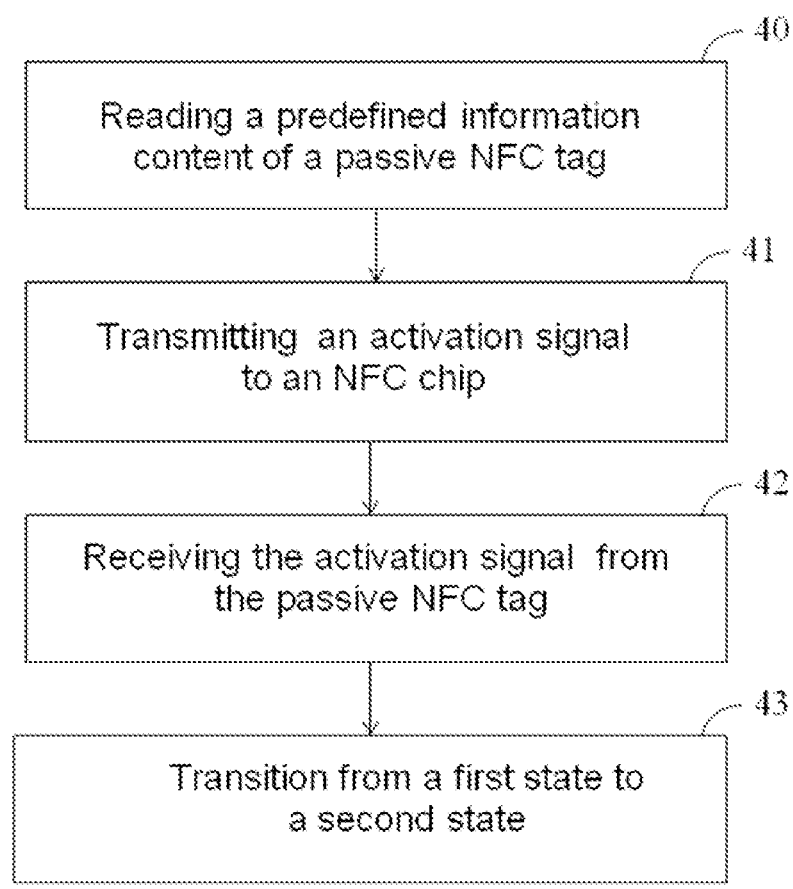
FIG. 4 is a flowchart describing the relevant operation of the near field communication system shown in FIG. 2, in accordance with an exemplary embodiment.

FIG. 4 is a flowchart describing the relevant operation of the near field communication system described with reference to FIG. 2 and FIG. 3 above. As shown, the flow starts with step 40 which describes that the second electronic device preferably the mobile phone 20 when arrives at the proximate distance with the first device preferably the speaker 10, the active NFC reader 22 of the mobile device 20 initiates reading a predefined information content embedded in the passive NFC tag 12 of the speaker 10. The predefined information content preferably includes a uniform resource locator (URL), a short message service (SMS), a Phone number, an authenticated code, and the like. Flow then proceeds to step 41.

The step 41 describes that the NFC tag 12 on detecting its predefined information content being read by the NFC reader 22 generates an activation signal in response and is transmitted to the NFC chip 11 in communication therewith also embodied in the speaker 10. The transmission of the activation signal from the NFC tag 12 to the NFC chip 11 is preferably by means of the transceiver 13 having an embedded antenna 14 therein, or optionally the transmission can also be wired link as will be appreciated by those skilled in the art. Flow then proceeds to step 42. The step 42 describes about reception of the activation signal by the NFC chip 11 from the NFC tag 12. Flow then proceeds to step 43.

The step 43 describes about transition of the NFC chip 11 from its first state i.e. the standby state to the second state i.e. the wakeup or the ON state on receiving the activation signal from the NFC tag 12. On turning to the active state, the NFC chip 11 establishes a near field communication link with the mobile phone 20 and then continues the connection to pair up with the mobile phone 20 thereby enabling exchange of the digital information content there between. The digital information content preferably includes the audio content, the video content, the textual content, and the like. By the way of an example, the mobile phone 20 will be able to automatically play the audio content through the speaker 10 on arriving in the proximate distance with speaker 10.

While the present invention has been described in connection with certain preferred embodiments, it is to be understood that the subject matter encompassed by way of the present invention is not to be limited to those specific embodiments. On the contrary, it will be appreciated that some hardware components may be used with other hardware components or articles. It is intended for the subject matter of the invention to include all alternatives, modifications and equivalents as can be included within the spirit and scope of the invention.

What is claimed is:

1. A near field communication system configured to automatically establish an interconnection between two electronic devices, comprising:
   a first electronic device including an NFC chip communicatively coupled to a passive NFC tag, said NFC tag having an integrated circuit with a predefined information content;
   a second device including an active NFC reader configured to read said predefined information content of said NFC tag based on an identification of a proximate distance therebetween; and
   wherein said passive NFC tag being capable of transmitting an activation signal to said NFC chip to enable transition of said NFC chip from a first state to a second state such as to establish a near field wireless communication link between said first device, and said second device and enable exchange of digital content therebetween; and
   wherein said NFC tag including a wireless transceiver to transmit said activation signal to said NFC chip.

2. The system of claim 1, wherein said near field wireless communication link comprises at least one a Bluetooth, Wi-Fi, Wireless Local Area Network (WLAN), Infrared Data Association (IrDA), Zigbee, Radio Frequency Identification (RFID), and Near Field Communication (NFC).

3. The system of claim 1, wherein said first state comprising a standby state where said NFC chip remains in an inactive mode of operation until said active NFC reader reads on said predefined information content of said passive NFC tag.

4. The system of claim 1, wherein said second state comprising a wakeup state where said NFC chip remains in an active mode of operation until said second device move beyond the proximate distance.

5. The system of claim 1, wherein said predefined information content comprises at least one a uniform resource locator (URL), a short message service (SMS), a Phone number, and an authenticated code.

6. The system of claim 1, wherein said digital content including at least one an audio content, video content, and a textual content.

7. A near field communication method to automatically establish an interconnection between two electronic devices, said method comprising the steps of:
   reading, a predefined information content of a passive NFC tag communicatively coupled to an NFC chip, both being operably configured in a first electronic device, by an active NFC reader configured in a second electronic device;
   transmitting, via communication between said passive NFC tag and said NFC chip, an activation signal to said NFC chip; and
   receiving, from said passive NFC tag, said activation signal, by said NFC chip to enable transition from a first state to a second state associated thereof such as to establish a near field wireless communication link between said first device, and said second device and enable exchange of digital content therebetween; and
   wherein said step of transmission is enabled by means of a wireless transceiver.

8. The method of claim 7, wherein said near field wireless communication link comprises at least one a Bluetooth, Wi-Fi, Wireless Local Area Network (WLAN), Infrared Data Association (IrDA), Zigbee, Radio Frequency Identification (RFID), and Near Field Communication (NFC).

9. The method of claim 7, wherein said first state comprising a standby state where said NFC chip remains in an inactive mode of operation until said active NFC reader reads on said predefined information content of said passive NFC tag.

10. The method of claim 7, wherein said second state comprising a wakeup state where said NFC chip remains in an active mode of operation until said second device move beyond the proximate distance.

11. The method of claim 7, wherein said predefined information content comprises at least one a uniform resource locator (URL), a short message service (SMS), a Phone number, and an authenticated code.

12. The method of claim 7, wherein said digital content including at least one an audio content, video content, and a textual content.

* * * * *